United States Patent
Zhou

(10) Patent No.: US 7,069,471 B2
(45) Date of Patent: Jun. 27, 2006

(54) SYSTEM PROM INTEGRITY CHECKER

(75) Inventor: Charles J. Zhou, Mt. View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 633 days.

(21) Appl. No.: 10/273,454

(22) Filed: Oct. 18, 2002

(65) Prior Publication Data

US 2004/0078561 A1     Apr. 22, 2004

(51) Int. Cl.
G06F 11/00 (2006.01)
(52) U.S. Cl. .......................................... 714/36
(58) Field of Classification Search ................... 714/36
See application file for complete search history.

(56) References Cited

U.S. PATENT DOCUMENTS

| | | | |
|---|---|---|---|
| 5,075,841 A * | 12/1991 | Kaneko | 714/36 |
| 6,128,694 A | 10/2000 | Decker et al. | |
| 6,185,696 B1 * | 2/2001 | Noll | 714/6 |
| 6,452,836 B1 | 9/2002 | Roohparvar | |
| 6,571,347 B1 * | 5/2003 | Tseng | 714/6 |
| 6,591,389 B1 | 7/2003 | Daudelin et al. | |
| 6,614,694 B1 | 9/2003 | Yeh et al. | |
| 6,629,259 B1 * | 9/2003 | Lee | 714/2 |
| 6,665,813 B1 * | 12/2003 | Forsman et al. | 714/15 |
| 6,745,343 B1 * | 6/2004 | Barenys et al. | 714/36 |
| 6,792,556 B1 * | 9/2004 | Dennis | 714/6 |
| 2002/0023181 A1 * | 2/2002 | Brown et al. | 710/8 |
| 2003/0005277 A1 | 1/2003 | Harding et al. | |
| 2003/0079138 A1 * | 4/2003 | Nguyen et al. | 713/193 |
| 2004/0003322 A1 * | 1/2004 | Collins et al. | 714/27 |

OTHER PUBLICATIONS

White, Ron; How Computers Work, 2004, Que Publishing, seventh edition, pp. 20-35.*
IBM Technical Disclosure Bulletin, vol. 33, No. 6B, Nov. 1990, ROS Code Integrity Protection.
International search report application No. GB 0324268.2 mailed Mar. 15, 2004.

* cited by examiner

Primary Examiner—Robert W. Beausoliel
Assistant Examiner—Michael Maskulinski
(74) Attorney, Agent, or Firm—Meyertons Hood Kivlin Kowert & Goetzel, P.C.; B. Noël Kivlin; Erik A. Heter

(57) ABSTRACT

A method and apparatus for ensuring the integrity of a system PROM. In one embodiment, a computer system includes a system PROM mounted upon a system board, which may also include a processor. The system PROM may include a static storage area reserved for storing system information that is not to be overwritten during normal system operations. Responsive to booting the computer system, the contents stored in the static portion of the system PROM may be duplicated and stored in a storage unit. During computer system operations, the duplicated contents stored in the storage unit may be compared with the contents of the static portion of the system PROM. If the duplicate contents are different from the contents stored in the static portion of the system PROM, a system alert may be performed in order to notify an operator or technician that the system PROM is corrupted.

19 Claims, 4 Drawing Sheets

SYSTEM PROM INTEGRITY CHECKER

BACKGROUND OF THE INVENTION

1. Field of the Invention

This invention relates to computer systems, and more particularly, to mechanisms to ensure reliability, serviceability, and availability.

2. Description of the Related Art

Many computer systems utilize various forms of read-only memory (ROM) in order to store critical system information. Such ROMs may include EEPROMs (electrically erasable/programmable ROM), SEEPROMs (serial EEPROM) and a wide variety of other read only memory types. The system PROM may store such information such as serial numbers, unit ID, part number, date of manufacture, current time and temperature, unit history, engineering change order data, and so forth. This information may be especially useful in field replaceable units (FRU's) in computer systems designed for high-availability (e.g. file servers). The data in these system PROMs may be useful in quickly diagnosing problems, or determining if an FRU must be replaced in order to ensure system reliability.

In many cases, a system PROM may be divided into a static section and a dynamic section. The dynamic section of ROM may be used to store information such as power, temperature, test histories, and so forth. The static section of the ROM may be used to store information including the part number, the serial number, and may also store information that is required in order to boot the computer system.

During system operation, it is possible for the system PROM to become corrupted. This can be especially troublesome when the static area of the ROM becomes corrupted, since information required for booting the computer system may be stored there. A corrupted system PROM may prevent a computer system from booting up. Since the computer system is unbootable at that point, it may be difficult to isolate the problem, since the failure of other system components may also cause a boot failure. Thus, it may be possible to incur a significant amount of time and expense in order to solve a problem that is simply based on a corrupted system PROM.

SUMMARY OF THE INVENTION

A method and apparatus for ensuring the integrity of a system PROM is disclosed. In one embodiment, a computer system includes a system PROM mounted upon a system board, which may also include a processor. A storage unit may be coupled to both the system PROM and the processor. The system PROM may include a static storage area reserved for storing system information that is not to be overwritten during normal system operations. Responsive to booting the computer system, the contents stored in the static portion of the system PROM may be copied and stored in the storage unit. During normal computer system operations, the duplicated contents stored in the storage unit may be compared with the contents of the static portion of the system PROM. If the duplicate contents in the storage unit are different from the contents stored in the static portion of the system PROM, a system alert may be performed in order to notify an operator or technician that the system PROM is corrupted.

In one embodiment, the system board may be a field replaceable unit (FRU) including the processor and the system PROM. The system PROM may be a serial ROM, such as a serial electrically erasable-programmable ROM (SEEPROM). Embodiments including a parallel ROM are also possible and contemplated. The system PROM may include a write-protect pin for protecting the static portion. The write protect pin may be held in the required logic state in order to prevent the static portion from being overwritten during normal system operations. In some embodiments, if the comparison of the contents with the static portion with that of the duplicated contents determines a difference, the write protect pin may be placed in a logic state that enables writing to the static portion. The duplicated contents may then be copied from the storage unit into the static portion in order to restore them to their original state.

BRIEF DESCRIPTION OF THE DRAWINGS

Other aspects of the invention will become apparent upon reading the following detailed description and upon reference to the accompanying drawings in which.

Figure 1A:
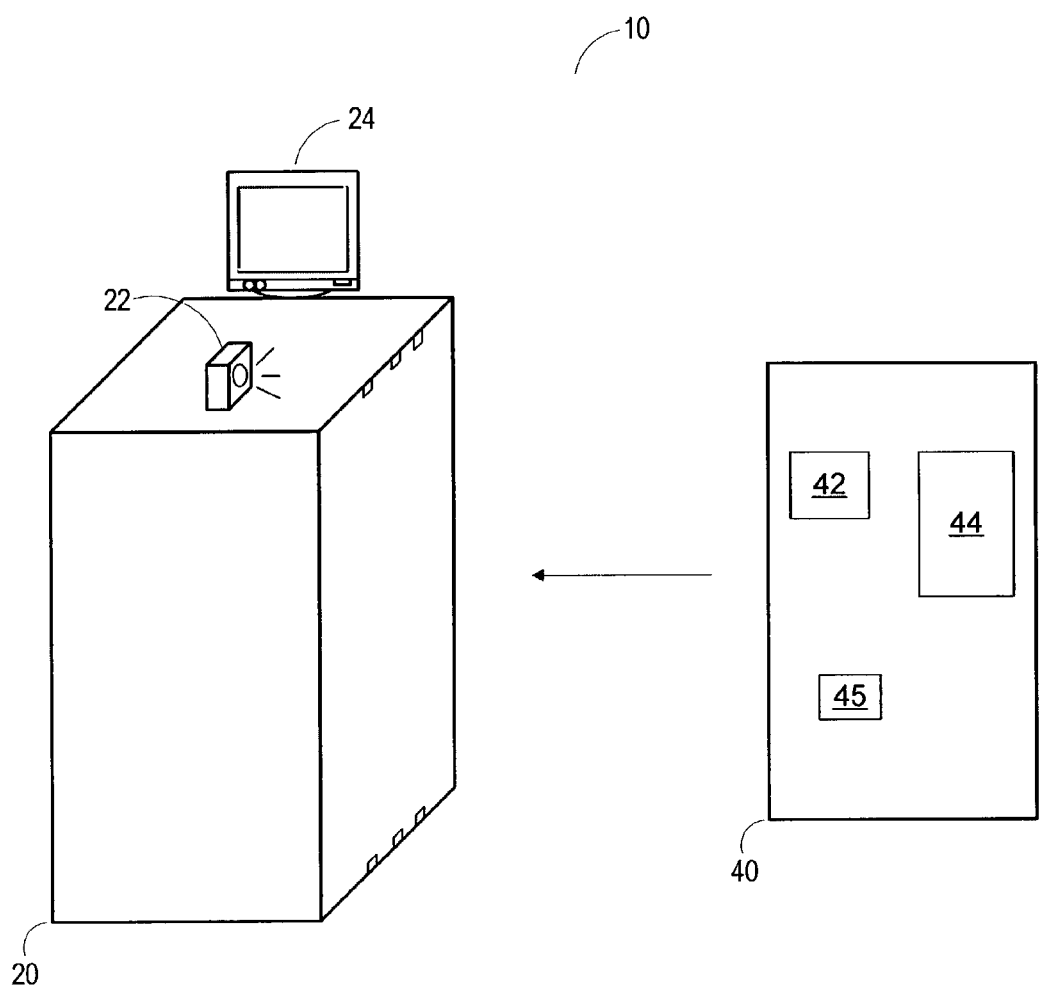
FIG. 1A is a drawing of one embodiment of a computer system including a chassis and system board that is a field-replaceable unit (FRU)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1A a drawing of one embodiment of a computer system including a chassis and system board that is a field-replaceable unit (FRU) is shown. Computer system 10, in the embodiment shown, includes system board 40 and chassis 20. System board 20 may also be configured for plug-and-play operations, and may be hot pluggable. In the embodiment shown, system board 40 is configured to be mounted into chassis 20. Chassis 20 may include other boards as well. A display 24 and a speaker 22 may be coupled to chassis 40, and may be utilized to perform any necessary system alerts.

In the embodiment shown, system board 40 includes processor 42, storage unit 44, and system PROM 45. Various embodiments of system board 40 may include multiple processors for systems that utilize multi-processor capability. Additional instances of system board 40 may also be located in chassis 20 as a method of providing multiprocessor capability.

Storage unit 44 on system board 40 may be implemented using various types of hard storage capability. In one embodiment, storage unit 44 may be a hard disk drive. Other embodiments may include storage types including flash memory, CD-RW (compact disk read/write) or various types of static memory. Embodiments where storage unit 44 is mounted within chassis 20 or located on another board (e.g. a daughter board) are also possible and contemplated.

System PROM 45 may be mounted on system board 40, and may be used to store system information during normal operations. Details of the types of information stored in system PROM 45 will be discussed below. System PROM 45 may be serial or a parallel ROM. In one embodiment, system PROM 45 may be a serial electrically erasable-programmable ROM (SEEPROM). In SEEPROM embodiments, data may be transferred to or from system PROM 45 using a serial bus. Addressing system PROM 45 in SEEPROM embodiments may also be performed serially. In parallel embodiments, data and address transfers may be performed on a parallel bus.

Figure 1B:
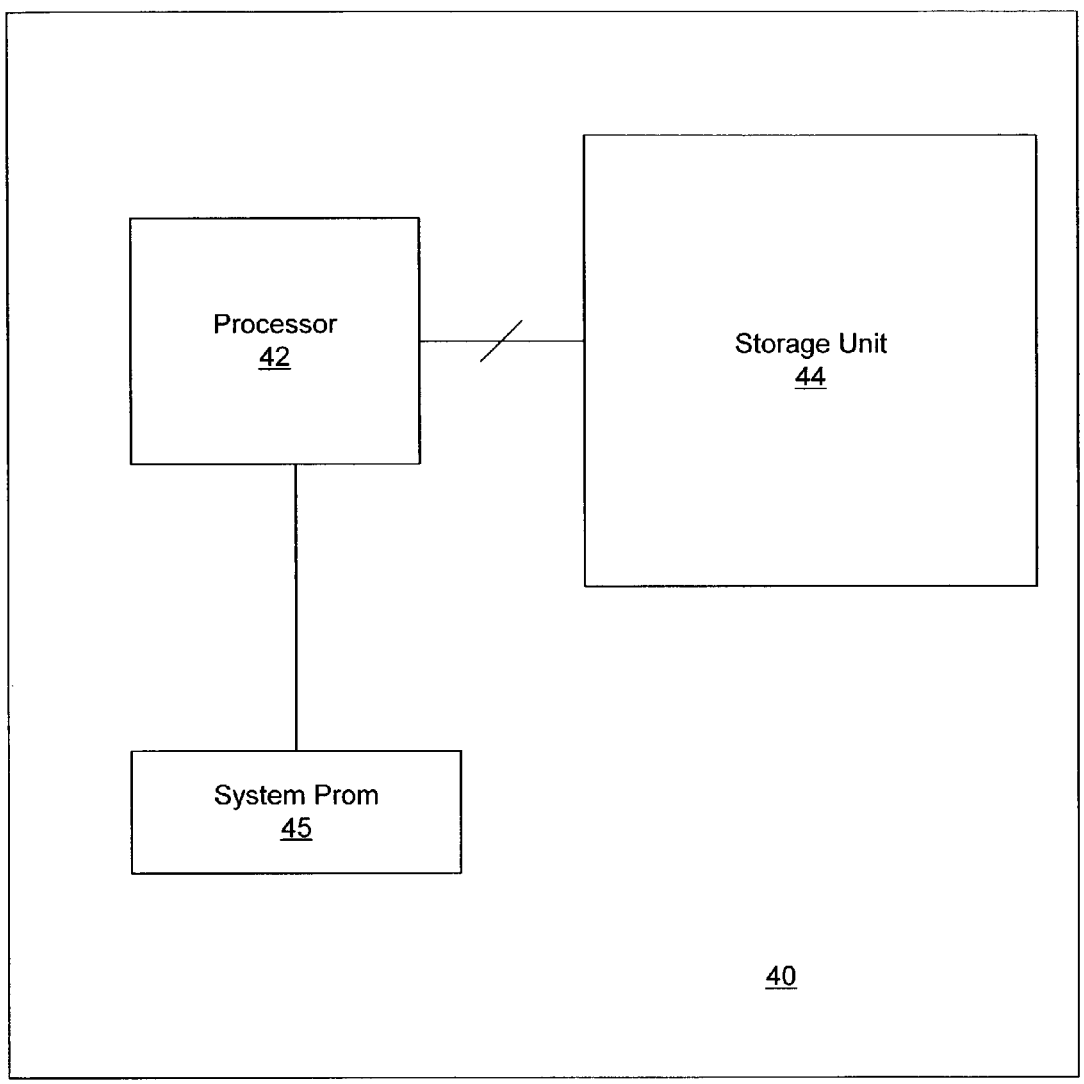
FIG. 1B is a block diagram of one embodiment of a computer system including a system programmable read-only memory (PROM)

FIG. 1B is a block diagram of one embodiment of a system board including a system read-only memory (ROM). In the embodiment shown, system board 40 includes processor 42, storage unit 44, and system PROM 45. System PROM 45 may be coupled to processor 42 by a bus. In embodiments where system PROM 45 is a SEEPROM, the bus may be a serial bus. Multiple serial buses may be present in order to couple system PROM 45 to processor 42, including an address bus and a data bus. In other embodiments, a single serial bus may be used for conveying both address and data signals. Some embodiments may couple processor 42 to system PROM using one or more parallel buses, which may be used for conveying data and address information.

Processor 42 may also be coupled to storage unit 44. In one embodiment, a parallel bus may be used to couple storage unit 44 to processor 42. In some embodiments, storage unit 44 may be directly coupled to system PROM 45. In some embodiments, system board 40 may not include a storage unit 44, which may be located elsewhere in the system.

System board 40 may be configured to be received by a computer system chassis. In one embodiment, system board 40 may be a field replaceable unit, and may be configured for plug-and-play operations.

Figure 2:
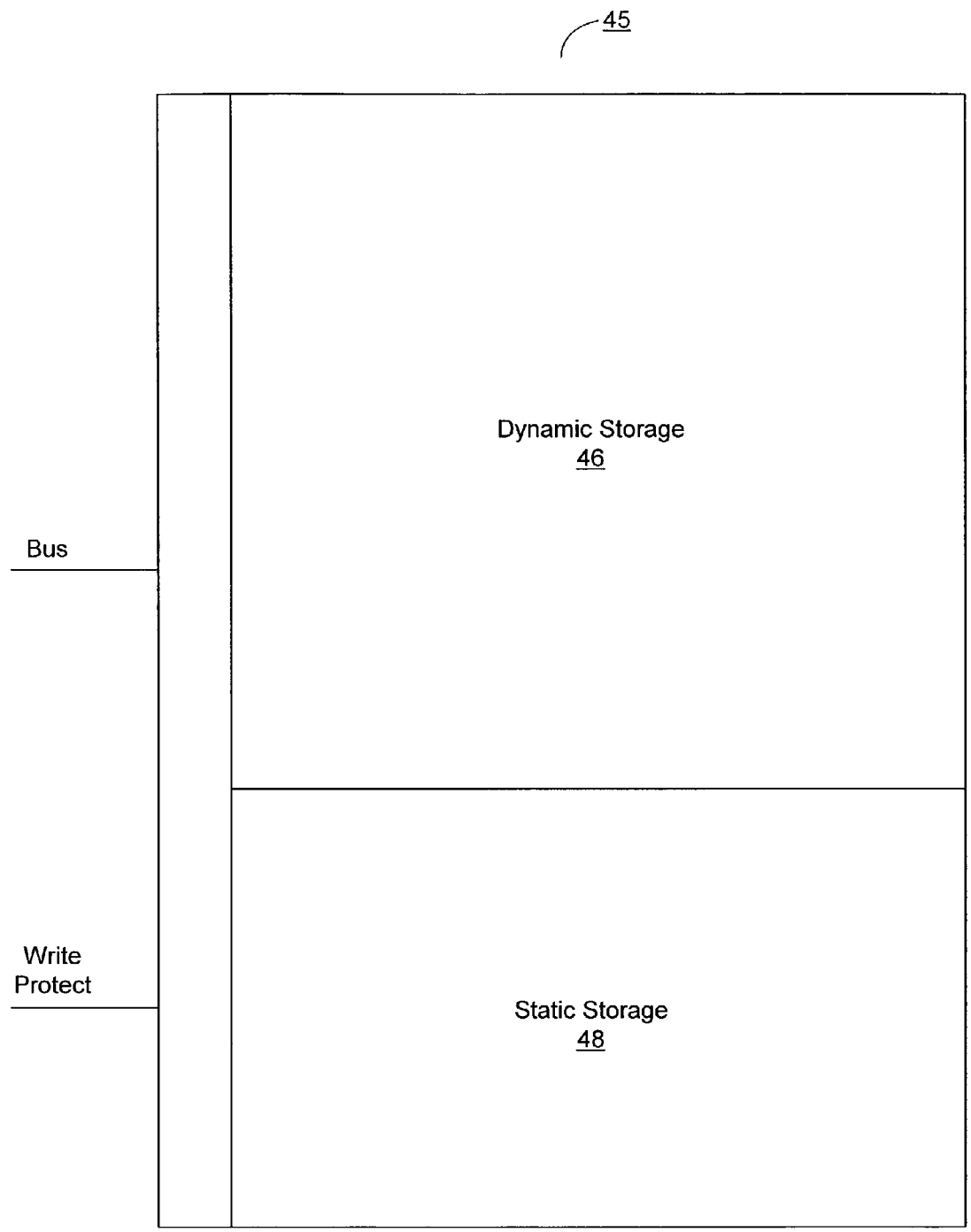
FIG. 2 is a diagram of one embodiment of a system PROM illustrating the areas designated for static and dynamic storage.

Moving now to FIG. 2 a diagram of one embodiment of a system PROM illustrating the areas designated for static and dynamic storage is shown. In the embodiment shown, system PROM 45 is divided between dynamic storage 46 and static storage 48. A bus may be coupled to system PROM 45 in order to allow communications with other units of the system, such as processor 42 shown discussed above. A write protect pin may also be present. Write protect pin may be held in a specified logic state to prevent static portion 48 in system PROM 45 from being inadvertently overwritten.

During normal system operations, contents in dynamic storage 46 may be overwritten. Various types of information may be stored in dynamic storage 46, including system temperature, system power consumption, test history, installation history, repair history, and engineering change history. Some types of information, such as temperature and system power consumption information may be updated periodically during normal system operation. System test history may be updated each time certain tests are performed on the system (e.g. power-on self-tests that are performed when the system is booted). Other types of information may be written as necessary, such as engineering change order data or repair data. In general, dynamic storage 46 is intended as a "write many" portion of system PROM 45.

Information stored in static portion 48 may include data types such as date of manufacture, part number, serial number, vendor, and so on. In some embodiments, static portion 48 may include system configuration information as well. Some information stored in static portion 48 may be required in order to properly boot the computer system. In general, static portion 48 is intended as a "write once" portion of system PROM 45.

As noted above, system PROM 45 may include a write protect pin. The write protect pin, when held in a predetermined logic state, may prevent the contents of static portion 48 from being overwritten. For example, the write protect pin of one embodiment of system PROM 45 may be held in a logic high state in order to prevent the contents of static portion 48 from being overwritten. During the initial writing of information to static portion 48, the write protect pin may be held in a logic low state. Once the initial write of information to static portion 48 is completed, the system may drive the write protect pin to a logic high state. If it becomes necessary to rewrite the information to static portion 48, the write protect pin may be held in a logic low state during the write operation, returning to a logic high state upon completion.

The sizes of the static and dynamic portions may vary. In one embodiment, dynamic portion 46 may be configured to store approximately six kilobytes of information while static portion 48 may be configured to store two kilobytes of information. Other sizes are possible and contemplated, and capacity of both dynamic portion 46 and static portion 48 may be chosen in accordance with the needs of the system in which system PROM 45 is implemented.

While the example above refers to specific logic states, it should be noted that embodiments are possible and contemplated wherein the logic states are reversed (e.g. logic high state allows writing to static portion 48, logic low state protects against writing to static portion 48).

Figure 3:
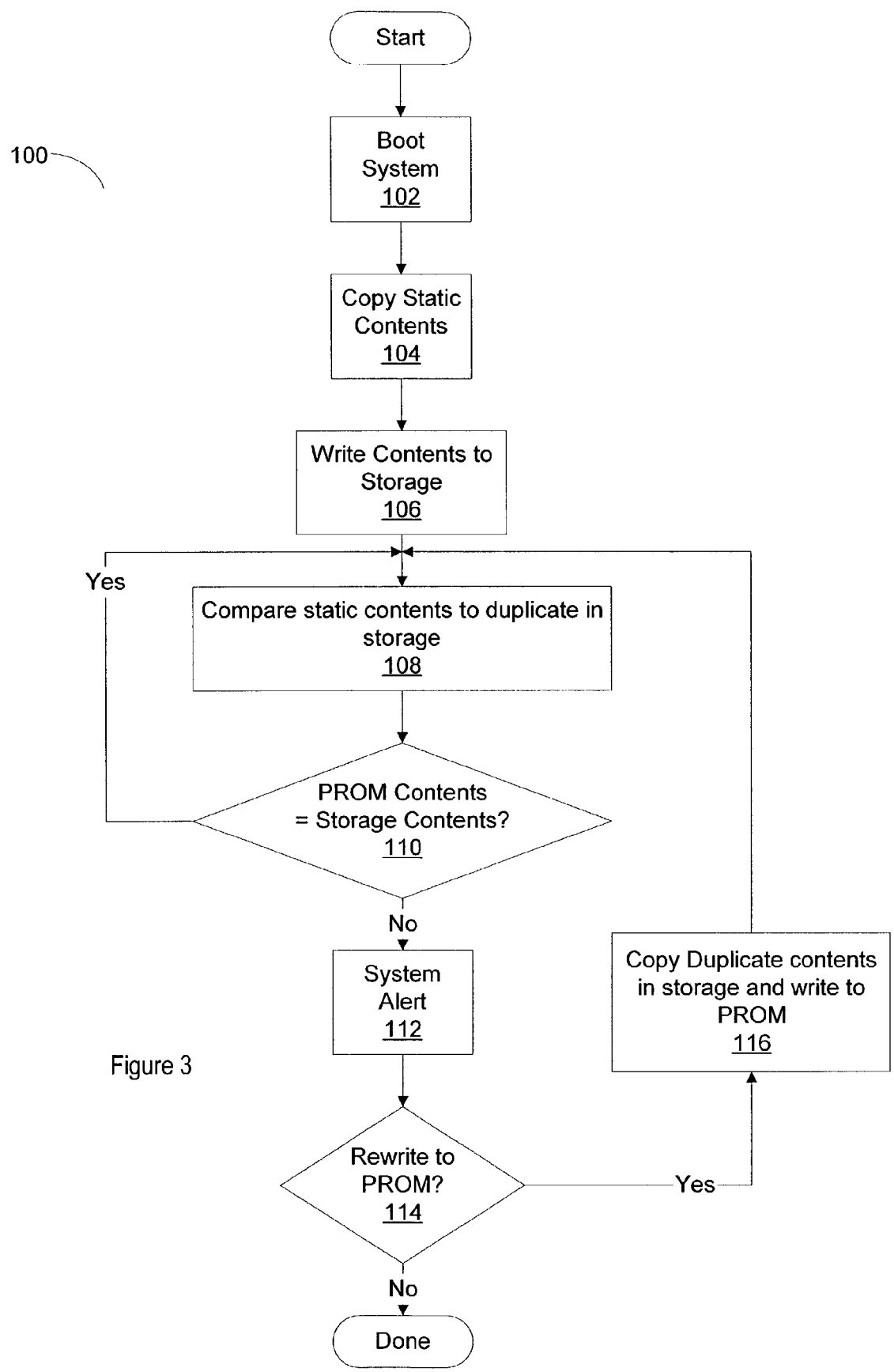
FIG. 3 is a flow diagram of one embodiment of a method for ensuring the integrity of static data stored in s system PROM.

FIG. 3 is a flow diagram of one embodiment of a method for ensuring the integrity of static data stored in s system PROM. In the embodiment shown, method 100 begins with the booting of a computer system (102). During the booting of the computer system, a script may be run. The script may perform various functions, including the copying of data stored in the static portion of a system PROM (104) after verifying that the initial system PROM integrity is good (i.e. a good indication for an uncorrupted system prom is that the computer system can be booted successfully). If the computer system cannot be booted past a certain stage of the boot-up process, it may indicate a corrupted system PROM, and thus no copying of data stored in the static portion of the system PROM may be conducted. Some of the information stored in the static portion of the system PROM may be critical for proper system startup. Information copied from the static portion of the system PROM may be written into and stored into a type of system storage (106). Various types of system storage may be used in order to store the duplicated contents of the static portion. In one embodiment, hard disk storage may be used to store these contents. Other embodiments may store the duplicated contents in flash memory, system RAM (random access memory), static RAM, or other types of media.

Since the data stored in the static portion of the system ROM may be critical for proper system startup, the computer system may periodically, or before system shutdown or while in a maintenance mode, compare the contents of the static portion of the system PROM with the duplicated contents stored in system storage (108). Various methods of comparison may be used. In some embodiments, a cyclic redundancy check may be performed. During a cyclical redundancy check, the computer system may calculate a value known as a checksum for both the static portion contents stored in the system PROM and the duplicate contents stored in the storage unit. Different checksum values may indicate that the data stored in the static portion has been corrupted. Other methods of comparing the static portion contents of the system PROM with the duplicate contents in the storage unit are possible and contemplated (e.g. byte-by-byte comparisons). Multiple comparison methods may be employed as well.

Depending on the results of the comparison between the static PROM contents and the duplicated contents in the storage unit, a decision is made by the system on how to proceed (110). If the comparison shows that the contents are the same, the system may continue performing the desired operation including periodic checks if needed. If the comparison shows that the contents are different, a system alert may be performed (112). Various types of system alerts may be performed. Such types of alerts include visual indications on a system display or providing an audio alert through a system speaker. Performing a system alert may also include disabling the ability of the system to shut down by deactivating system shutdown commands. Disabling the ability for the system to shut down may allow a technician to perform troubleshooting and repair without having to reboot the system, which may not be possible in the event that the data stored in the static portion of the system PROM is corrupted.

In some embodiments, a decision may be made to rewrite the necessary data to the static portion of the system PROM (114). If the decision is made to perform a rewrite, the duplicate contents stored in the storage unit may be copied and rewritten to the static portion of the system PROM. This may include toggling a write protect pin on the system PROM as discussed above. Once the contents have been rewritten, the system may return to normal operations, including the performing of periodic comparisons of the data between the static portion of the system PROM and the duplicated contents in the storage unit. If the decision is made to not perform a rewrite, the method may be considered complete, and a technician may begin troubleshooting operations on the system.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
   booting a computer system;
   copying contents stored in a portion of a system programmable read-only memory (PROM) responsive to said booting;
   storing a duplicate of the contents in a storage unit;
   periodically comparing the contents stored in the portion of the system PROM with the duplicate of the contents in the storage unit;
   performing a system alert if the contents stored in the portion of the system PROM are different from the contents in the storage unit, wherein performing a system alert includes deactivating of system shutdown commands.

2. The method as recited in claim 1, wherein the contents stored in the portion of the system PROM are static.

3. The method as recited in claim 2, wherein the system PROM includes a static portion and a dynamic portion.

4. The method as recited in claim 1, wherein the system PROM is a serial electrically erasable-programmable ROM (SEEPROM).

5. The method as recited in claim 1, wherein performing a system alert includes invoking an indication on a visual display.

6. The method as recited in claim 1, wherein performing a system alert includes providing an audio indication.

7. The method as recited in claim 1 further comprising writing the duplicate of the contents in the storage unit to the portion of the system PROM responsive to determining the contents stored in the portion of the system PROM are different from the contents in the storage unit.

8. The method as recited in claim 1, wherein the system PROM is mounted upon a system board.

9. The method as recited in claim 8, wherein the system board is a field replaceable unit (FRU).

10. The method as recited in claim 9, wherein the FRU is configured for plug-and-play.

11. A computer system comprising:
    a system programmable read-only memory (PROM); and
    a storage unit;
    wherein the computer system is configured to, responsive to booting:
       copy contents stored in a portion of the system PROM;
       store a duplicate of the contents in the storage unit;
       periodically compare the contents stored in the portion of the system PROM to the duplicate of the contents in the storage unit; and
       perform a system alert if the contents stored in the portion of the system PROM are different from the duplicate of the contents in the storage unit, wherein performing a system alert includes deactivating of system shutdown commands.

12. The computer system as recited in claim 11, wherein the system PROM is a serial electrically erasable-programmable ROM (SEEPROM).

13. The computer system as recited in claim 11, wherein performing a system alert includes invoking an indication on a visual display.

14. The computer system as recited in claim 11, wherein performing a system alert includes providing an audio indication.

15. The computer system as recited in claim 11, wherein the system is configured to write the duplicate of the contents in the storage unit to the portion of the system PROM responsive to determining the contents stored in the portion of the system PROM are different from the contents in the storage unit.

16. The computer system as recited in claim 11, wherein the system PROM is mounted upon a system board.

17. The computer system as recited in claim 16, wherein the system board is a field replaceable unit (FRU).

18. The computer system as recited in claim 17, wherein the FRU is configured for plug-and-play.

19. The computer system as recited in claim 18, wherein the FRU is configured for hot-plugging.

* * * * *